(12) United States Patent  
Hijikata (10) Patent No.: US 7,041,359 B2  
(45) Date of Patent: May 9, 2006

(54) HONEYCOMB STRUCTURE AND ASSEMBLY THEREOF

(75) Inventor: Toshihiko Hijikata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 85 days.

(21) Appl. No.: 10/473,204

(22) PCT Filed: Apr. 1, 2002

(86) PCT No.: PCT/JP02/03243

§ 371 (c)(1),  
(2), (4) Date: Sep. 29, 2003

(87) PCT Pub. No.: WO02/081880

PCT Pub. Date: Oct. 17, 2002

(65) Prior Publication Data

US 2004/0101654 A1  May 27, 2004

(30) Foreign Application Priority Data

Apr. 3, 2001 (JP) .............................. 2001-105134

(51) Int. Cl.  
*B32B 3/12* (2006.01)  
*B01D 53/00* (2006.01)

(52) U.S. Cl. ...................... 428/116; 428/117; 422/179; 422/180; 422/181

(58) Field of Classification Search .............. 428/116, 428/117; 422/177, 179, 180, 181; 522/523, 522/493, 490  
See application file for complete search history.

(56) References Cited

U.S. PATENT DOCUMENTS

| 4,335,783 | A |  | 6/1982 | McBrayer et al. ............. 165/8 |
|---|---|---|---|---|
| 4,448,828 | A |  | 5/1984 | Mochida et al. ............... 428/36 |
| 4,810,554 | A |  | 3/1989 | Hattori et al. ............... 428/116 |
| 5,108,685 | A |  | 4/1992 | Kragle ................... 264/177.12 |
| 5,782,089 | A | * | 7/1998 | Machida et al. ............... 60/299 |
| 5,866,079 | A | * | 2/1999 | Machida et al. ............ 422/179 |

FOREIGN PATENT DOCUMENTS

EP  0 361 833 A1  4/1990

(Continued)

OTHER PUBLICATIONS

Suresh T. Gulati; "Strength and Thermal Shock Resistance of Segmented Wall-Flow Diesel Filters"; Sae Technical Paper Series; Feb. 24-28, 1996; pp. 11-18.

*Primary Examiner*—Stephen Stein  
*Assistant Examiner*—Timothy M. Speer (57) ABSTRACT

There is disclosed a honeycomb structure (1) comprising: a plurality of honeycomb segments (2a, 2b), bonded into one piece, having a large number of cells (6) separated from one another by cell walls (10) and extending through an axial direction. At least one honeycomb segment (2a) not constituting an outermost peripheral surface (23) of the honeycomb structure (1) has a larger average cell wall thickness and a smaller or equal cell density compared with those of at least one honeycomb segment (2b) constituting the outermost peripheral surface (23). There is disclosed a honeycomb structure assembly in which a material B having compressive elasticity is disposed in a compressed state on the outermost peripheral surface (23) of the honeycomb structure (1) to compression-hold the honeycomb structure (1) in a metallic container. The honeycomb structure and assembly can prevent deterioration of reactivity, purification efficiency, and regeneration efficiency at the time of use, and can be low in pressure loss and better in durability against breakage by thermal stress.

18 Claims, 7 Drawing Sheets

FOREIGN PATENT DOCUMENTS

| | | |
|---|---|---|
| EP | 0 643 204 A2 | 3/1995 |
| JP | A 54-110189 | 8/1979 |
| JP | A 54-150406 | 11/1979 |
| JP | A 55-147154 | 11/1980 |
| JP | A 55-155742 | 12/1980 |
| JP | U 61-113915 | 7/1986 |
| JP | B2 61-51240 | 11/1986 |
| JP | A 5-168834 | 7/1993 |
| JP | A 8-28246 | 1/1996 |
| JP | A 9-155203 | 6/1997 |
| JP | A 9-220480 | 8/1997 |
| JP | A 10-244167 | 9/1998 |
| JP | A 2000-210517 | 8/2000 |
| JP | 2000-279728 | * 10/2000 |
| JP | A 2000-279728 | 10/2000 |

* cited by examiner

HONEYCOMB STRUCTURE AND ASSEMBLY THEREOF

BACKGROUND

The present invention relates to a honeycomb structure used in, for example, a substrate for a catalyst utilizing a catalytic action, for use in an internal combustion engine, a boiler, a chemical reactor, a fuel cell reformer, etc., and a filter for trapping particulate present in an exhaust gas; as well as to an assembly thereof. More particularly, the present invention relates to a honeycomb structure that has better durability for thermal stress in use and has less pressure loss feature, as well as relates to an assembly thereof.

Honeycomb structures are in use in, for example, a carrier for a catalyst having a catalytic action, for use in an internal combustion engine, a boiler, a chemical reactor, a fuel cell reformer, etc., and a filter for trapping particulate present in an exhaust gas, particularly particulate emitted from a diesel engine.

In the honeycomb structure used for such a purpose, the rapid temperature change of exhaust gas and the local heating makes non-uniform the temperature distribution inside the honeycomb structure, and there have been problems such as crack generation in honeycomb structure and the like. When the honeycomb structure is used particularly as a filter for trapping a particulate substance in an exhaust gas emitted from a diesel engine, it is necessary to burn the fine carbon particles deposited on the filter to remove the particles and regenerate the filter and, in that case, high temperatures are inevitably generated locally in the filter; as a result, this process tends to generate large thermal stress and cracks.

Hence, there were proposed processes for producing a honeycomb structure by bonding a plurality of individual segments using an adhesive.

For example, U.S. Pat. No. 4,335,783 discloses a process for producing a honeycomb structure, which comprises bonding a large number of honeycomb parts using a discontinuous adhesive. JP-B-61-51240 proposes a thermal shock resistant rotary regenerating thermal exchanging system which comprises forming, by extrusion, matrix segments of honeycomb structure made of a ceramic material, firing them, making smooth, by processing, the outer peripheral portions of the fired segments, coating the to-be-bonded areas of the resulting segments with a ceramic adhesive having, when fired, substantially the same chemical composition as the matrix segments and showing a difference in thermal expansion coefficient, of 0.1% or less at 800° C., and firing the coated segments. SAE paper 860008 of 1986 discloses a ceramic honeycomb structure obtained by bonding cordierite honeycomb segments with a cordierite cement. JP-A-8-28246 discloses a ceramic honeycomb structure obtained by bonding honeycomb ceramic members with an elastic sealant made of at least a three-dimensionally intertwined inorganic fiber, an inorganic binder, an organic binder and inorganic particles.

Meanwhile, the regulation for exhaust gas has become stricter and engines have come to have higher performance. As a result, in order to achieve an improvement in combustion conditions of an engine and an increase in purification ability of a catalyst, the temperature of exhaust gas has increased year by year. In this connection, a higher thermal shock resistance has come to be required for honeycomb substrates. Therefore, even with honeycomb structures such as mentioned above, when a sharp temperature change of inflow gas takes place, and the local heat of reaction, the local heat of combustion, etc., become larger during use, it is considered to be possible that the thermal stress applied thereto is not sufficiently relaxed, cracks appear therein and, in an extreme case, there occur, for example, the disintegration of honeycomb structure and the breakage of the structure into fine pieces caused by vibration.

As means for solving the problem, there is a method of increasing a heat capacity of the honeycomb structure to reduce a temperature change, decelerating reaction and/or combustion rate, and lowering maximum temperature for relaxation of the thermal stress on the honeycomb structure. However, this method has disadvantages that reactivity, purification efficiency, and regeneration efficiency of the honeycomb structure drop and a pressure loss increases. With the use for purifying an automobile exhaust gas, there occur problems of deterioration of fuel consumption and drivability, and size enlargement of auxiliary devices. Moreover, in JP-B-54-110189, a structure has been proposed in which thickness of partition walls is regularly reduced toward a center of a cross section of a honeycomb substrate. Further in JP-A-54-150406 and JP-A-55-147154, a structure has been proposed in which cell walls of an outer peripheral portion of the honeycomb structure is thicker than that of an inner portion. Although such a honeycomb structure is strong against mechanical stress from the outside, the structure cannot be said to have sufficient durability against the thermal stress in use because of the thin inner cell walls.

The present invention has been developed in view of these conventional situations, and an object thereof is to provide a honeycomb structure which can prevent deterioration of reactivity, purification efficiency, regeneration efficiency, and the like in use and can lower pressure loss and can be better in durability against breakage by thermal stress.

SUMMARY

As a result of researches for solving the problems, the present invention has been made based on the findings that by suppressing temperature rise of a central part and keeping temperature of an outer peripheral portion high, deterioration of efficiencies such as reactivity can be prevented, and durability against thermal stress can be improved. It has further been found out that by making a cell wall thicker and making a cell density lower in the central part of a honeycomb structure than those in the outer peripheral portion, pressure loss can be reduced and the temperature rise in the central part can be suppressed without remarkable increase in overall heat capacity.

That is, according to a first aspect of the present invention, there is provided a honeycomb structure comprising a plurality of honeycomb segments bonded into one piece, each segment having a large number of cells separated from one another by cell walls and extending through an axial direction, wherein at least one of the honeycomb segments which do not constitute an outermost peripheral surface of the honeycomb structure has a larger average cell wall thickness and a smaller or equal cell density compared with those of at least one of the honeycomb segments which constitute the outermost peripheral surface.

In the first aspect of the present invention, a ratio of the cell density of at least one of the honeycomb segments which do not constitute the outermost peripheral surface to that of at least one of the honeycomb segments which constitute the outermost peripheral surface is preferably in a range of 1:1 to 1:6, and a ratio of the average cell wall thickness in at least one of the honeycomb segments which constitute the outermost peripheral surface to that in at least one of the honeycomb segments which do not constitute the outermost peripheral surface is preferably 0.2 to 0.9. A sectional area of at least one of the honeycomb segments which do not constitute the outermost peripheral surface is preferably in a range of 9% to 81% of that of the honeycomb structure. The honeycomb structure is used for purification of exhaust gas of an automobile, and more preferably is used as a filter for trapping diesel particulate. Furthermore, a material A having compressive elasticity, preferably a ceramic fiber-made mat, and more preferably a non-intumescent mat mainly composed of an alumina or mullite composition, is preferably provided at a part or the whole of the space between two adjacent honeycomb segments. Furthermore, the main component of each honeycomb segment preferably comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel, or metallic Si and SiC.

According to a second aspect of the present invention, there is provided a honeycomb structure assembly comprising the honeycomb structure mentioned above, a material B disposed in a compressed state on the outermost peripheral surface of the honeycomb structure, and a metallic container, wherein the honeycomb structure is compression-held in the metallic container by the material B.

In the second aspect of the present invention, the material B having compressive elasticity is preferably a ceramic fiber-made mat, more preferably a heat-intumescent mat containing vermiculite, or the non-intumescent mat mainly composed of an alumina or mullite composition. The honeycomb structure assembly is preferably a canned assembly obtained by a stuffing method, a tourniquet method, a clamshell method or a swaging method. The honeycomb structure assembly is preferably obtained by loading a catalyst on the honeycomb segments and then accommodating the catalyst-loaded honeycomb segments in the metallic container, or preferably obtained by accommodating the honeycomb segments in the metallic container and then loading a catalyst on the honeycomb segments.

DETAILED DESCRIPTION OF THE PREFERRED EMBODIMENTS

The honeycomb structure and the honeycomb structure assembly of the present invention are described in detail below with reference to the accompanying drawings. However, the present invention is not restricted to the following embodiment. Incidentally, in the following, "section" refers to a section vertical to the direction of cell passage unless otherwise specified.

Figure 1A:
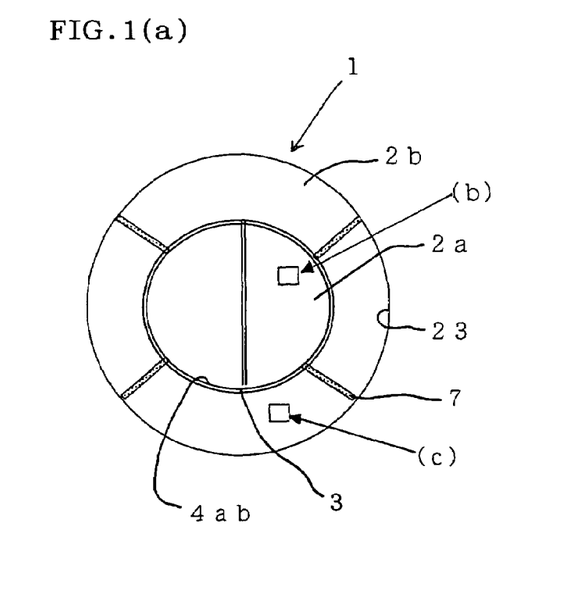
FIG. 1(a) is a schematic sectional view of a honeycomb structure according to one embodiment of the present invention.

FIG. 1(a) is a schematic sectional view of a honeycomb structure showing one embodiment of the honeycomb structure according to the present invention. Honeycomb segments 2a and 2b, as shown in FIGS. 1(b), (c), having a large number of cells 6 separated from one another by cell walls 10 and extending through an axial direction are bonded into one piece to constitute a honeycomb structure 1 of the present invention.

Figure 1B:
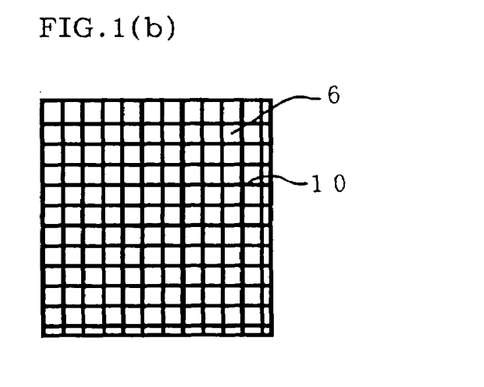
FIGS. 1(b) and 1(c) are enlarged views of inner and outer segments in FIG. 1(a)
Figure 1C:
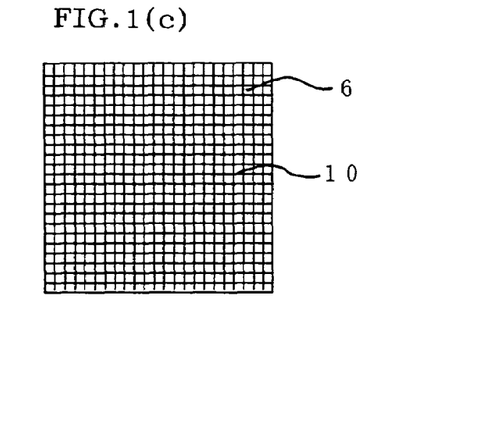

Important characteristics of the present invention lie in that, as shown in FIGS. 1(b), (c), the honeycomb segment 2a not constituting an outermost peripheral surface 23 has a larger average wall thickness and has an equal or lower cell density compared with those of the honeycomb segment 2b constituting the outermost peripheral surface. In the present invention, the average wall thickness means an average thickness of the cell walls 10 which do not include an outer peripheral wall of the honeycomb segment 2. The cell density means the number of cells per unit sectional area (cell number/cm$^2$). Since the honeycomb structure of the present invention is constituted in this manner, the cell density of a central part is smaller. Therefore, even when the cell wall is thickened, pressure loss can be reduced, and reaction rate of the central part including the thick cell wall can be lowered, a maximum temperature in the honeycomb structure therefore drops, and the temperature of the outer segment having a thin cell wall rises. As a result, a sufficient reactivity, purification efficiency, and regeneration efficiency can be held, while the temperature distribution of the whole honeycomb structure can be reduced. Therefore, according to the honeycomb structure 1 of the present invention, the pressure loss of the whole honeycomb structure can be reduced, the reactivity, purification efficiency, and regeneration efficiency can be increased, and the temperature distribution of the whole honeycomb structure can be reduced, so that low pressure loss, high durability, and high efficiency are revealed.

In the present invention, the honeycomb segment which does not constitute the outermost peripheral surface of the honeycomb structure (hereinafter referred to as the inner segment) means, for example in FIG. 1(a), either or both of two honeycomb segments 2a which do not constitute the outermost peripheral surface 23 of the honeycomb structure 1. The honeycomb segment constituting the outermost peripheral surface of the honeycomb structure (hereinafter referred to as the outer segment) means, for example in FIG. 1(a), any or all of four honeycomb segments 2b constituting the outermost peripheral surface 23 of the honeycomb structure 1. Therefore, for example, in FIGS. 1(a) to (c), at least one of the inner segments means one or two of two inner segments 2a, and at least one of outer segments means one, two, three, or four of four outer segments 2b. For example, in the present invention shown in FIGS. 1(a) to (c), at least one segment of two inner segments 2a is constituted to be larger in average thickness of the cell wall 10 and smaller in cell density than at least one segment of four outer segments 2b. In the present invention, the cell density of the inner segment 2a may be equal to that of the outer segment 2b, and the cell density of the inner segment 2a is preferably smaller than that of the outer segment 2b as described above. Moreover, both of two inner segments 2a are more preferably larger in the average wall thickness and smaller in the cell densities compared with those of any of four outer segments 2b.

Figure 2:
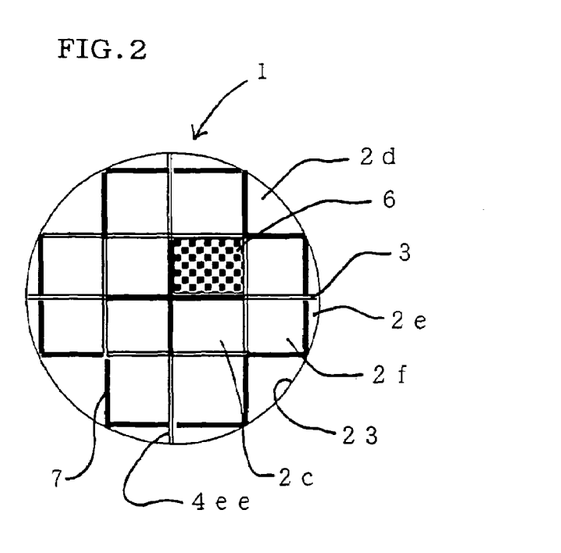
FIG. 2 is a schematic sectional view of the honeycomb structure according to another embodiment of the present invention.

FIG. 2 shows another embodiment of the present invention. In this case, four central honeycomb segments 2c having quadrangular sectional shapes are the inner segments, and 20 segments in total including eight honeycomb segments 2f, 2e and four honeycomb segments 2d are the outer segments. Therefore, the average wall thickness is larger and the cell density is equal or less in at least one segment of the inner segments 2c compared with those in at least one segment of the outer segments 2f, 2d, and 2e.

With the honeycomb segment 2c, having a large average wall thickness and equal or less cell density, being nearer to the central part of the honeycomb structure 1, it becomes more preferable. For example, in FIG. 2, the average wall thickness of four inner segments 2c in contact with a center on the section of the honeycomb structure 1 is preferably larger than that of any one of 20 outer segments 2d, 2f, and 2e, and more preferably larger than that of all outer segments.

A ratio of the cell density of the inner segment having a smaller cell density to that of the outer segment having a larger cell density is preferably 1:1 to 1:6, more preferably 1:1 to 1:5, further more preferably 1:1.1 to 1:5, and most preferably 1:1.1 to 1:4. Particularly, when the segment is used as a filter for diesel particulate, and when the cell density of the outer segment is smaller than that of the inner segment, a filter area is small, and a sufficiently low pressure loss cannot be obtained. When the cell density of the outer segment is excessively larger than that of the inner segment, it is difficult to plug cells, and the structure cannot substantially be manufactured.

A ratio of the average wall thickness in the outer segment having thin cell walls to that of the inner segment having thick cell walls is preferably 0.2 to 0.9, more preferably 0.3 to 0.9, and most preferably 0.5 to 0.8. When this ratio is excessively small, it is substantially difficult to manufacture the segments. When the ratio is too close to 1, the effect of the present invention is not obtained.

The sectional area of the inner segment having thick cell walls and having small cell density is preferably 9% or more, more preferably 16% or more, and further more preferably 25% or more of that of the whole honeycomb structure. The sectional area in the present invention means an area including a cell portion in a section vertical to the passage of cell 6 as shown in FIGS. 1(a) to (c), and FIG. 2. When this sectional area is excessively small, an effect of increasing the cell wall is not sufficient. Furthermore, the sectional area of the inner segment having the thick cell wall is preferably 81% or less of a volume of the whole honeycomb structure, more preferably 64% or less, and further more preferably 49% or less. When the sectional area is excessively large, reaction efficiency unfavorably drops.

In the present invention, the cell density of any of the inner and outer segments is preferably in a range of 0.9 to 310 cells/cm$^2$ (6 to 2000 cells/square inch). When the cell density is less than 0.9 cell/cm$^2$, the geometrical surface area is insufficient. When the cell density is more than 310 cells/cm$^2$, the pressure loss is too large.

From a viewpoint of manufacturing, a sectional shape of the cell 6 of the honeycomb segment 2 is preferably any of triangular, quadrangular, and hexagonal shapes.

The honeycomb structure 1 in the present invention includes the honeycomb segments 2 bonded into one piece, and for example, a bonding material 7 may be used to bond surfaces 4 adjacent to each other of the honeycomb segments 2. Moreover, a material A having compressive elasticity is also preferably disposed between the surfaces adjacent to each other. Furthermore, as shown in FIG. 1(a), a material A3 having compressive elasticity, preferably a ceramic fiber made mat is preferably disposed between surfaces 4ab adjacent to each other of the inner segment 2a and outer segment 2b. Furthermore, as shown in FIG. 2, the material A3 having compressive elasticity is also preferably disposed between surfaces 4ee adjacent to each other of the outer segments 2e. When the material A having compressive elasticity is disposed between the surfaces in this manner, the thermal stress is released, and durability of the honeycomb structure is further enhanced.

In the present invention, the material A having compressive elasticity is preferred to have heat resistance and cushioning.

As the compressive elasticity material A having heat resistance and cushioning, there is a non-intumescent material containing substantially no vermiculite or a low-intumescent material containing a small amount of vermiculite. Such a material is preferred to contain, as a main component, a ceramic fiber made of at least one kind selected from the group consisting of alumina, high alumina, silicon carbide, silicon nitride, zirconia and titania, or of a composite thereof. Among them, a non-intumescent material containing substantially no vermiculite and mainly composed of alumina of mullite is more preferred. Further, the material A having compressive elasticity is preferred to be a mat made of such a fiber, and the ceramic fiber-made mat is preferred to be a non-intumescent mat composed mainly of alumina or mullite. Further preferably, these ceramic-made mats have a sealing property for preventing the leakage of to-be-treated fluid. Preferred specific examples of the material A having compressive elasticity are 1100HT™ produced by 3M Co. and Maftec™ produced by Mitsubishi Chemical Corporation.

In the present invention, each honeycomb segment 2 is preferred to contain, as a main component, (1) at least one kind of ceramic selected from the group consisting of silicon carbide, silicon nitride, cordierite, alumina, mullite, zirconia, zirconium phosphate, aluminum titanate, titania and combinations thereof; and (2) Fe—Cr—Al, nickel; or metallic Si and SiC, from the standpoints of the strength, heat resistance, etc. In the present invention, "main component" means a substance which is 80% by mass or more of all components and which becomes a main crystalline phase.

The bonding material 7 can also be selected from materials preferable for the honeycomb segment.

When the material A having compressive elasticity is disposed, from the viewpoint of manufacturing, for the section of the honeycomb segment 2, at least one side is preferably 30 mm or longer, more preferably 50 mm or longer, and most preferably 70 mm or longer.

Figure 3:
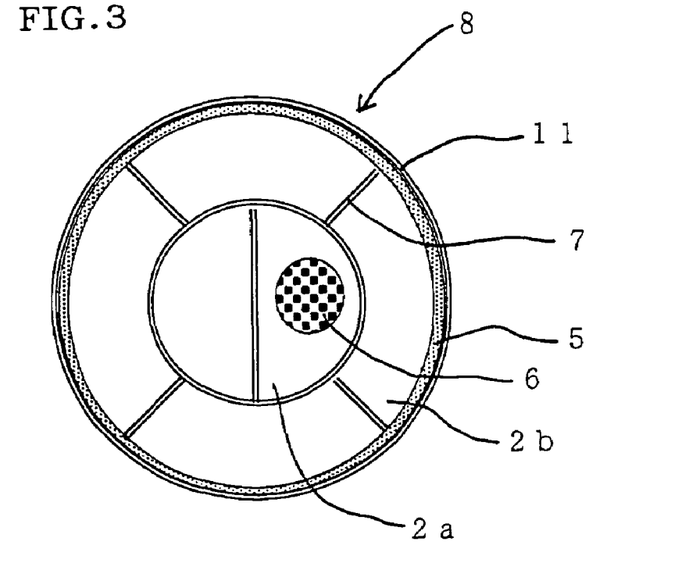
FIG. 3 is a schematic sectional view of the honeycomb structure assembly according to one embodiment of the present invention.

FIG. 3 is a schematic sectional view of a honeycomb structure assembly 8 in which the honeycomb structure shown in FIGS. 1(a) to (c) is held in a metallic container 11. For the honeycomb structure assembly 8 of the present invention shown in FIG. 3, the material B5 is disposed in a compressed state on the outermost peripheral surface 23 of the honeycomb structure 1. By the material B5, the honeycomb structure is compression-held in the metallic container 11.

In the present invention, the material B5 having compressive elasticity is preferred to have heat resistance and cushioning, similarly to the above-mentioned material A having compressive elasticity, and is further preferred to have sealing property. The material B having compressive elasticity may be a non-intumescent material or an intumescent material. The material B having compressive elasticity is preferred to be, for example, a ceramic fiber composed mainly of at least one kind selected from the group consisting of alumina, high alumina, mullite, silicon carbide, silicon nitride, zirconia and titania, or of a composite thereof, and is further preferred to be a mat made of such a fiber.

Specifically, there can be used, for example, 1100HT™ produced by 3M Co. and Maftec™ produced by Mitsubishi Chemical Corporation, both mentioned above. There can also be used, for example, Interlam Mat™ produced by 3M Co. (an intumescent mat).

Figure 4:
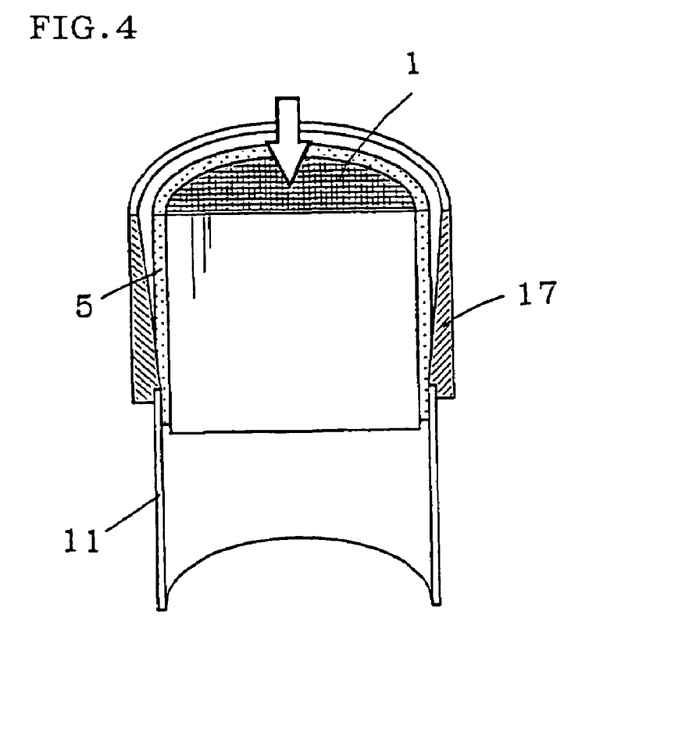
FIG. 4 is a partially cut-out explanatory view showing one example of a method for stuffing the honeycomb structure into a metallic container.
Figure 5:
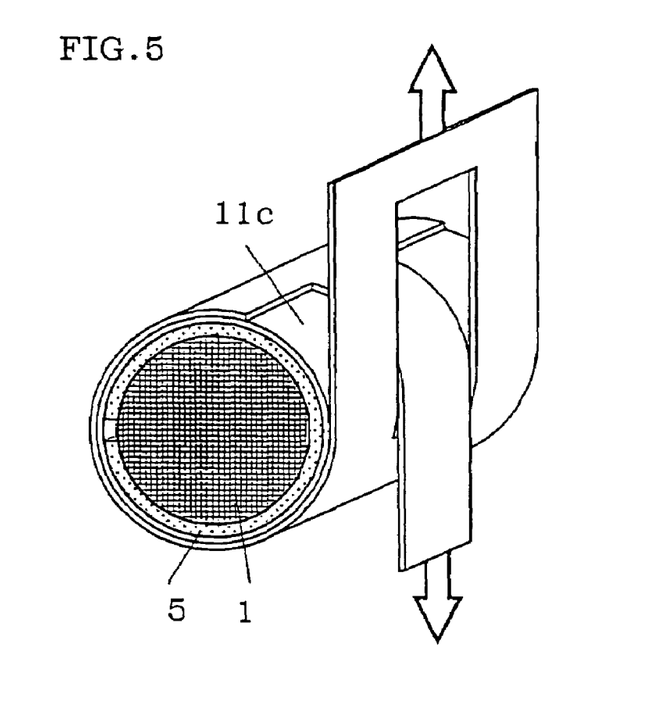
FIG. 5 is a perspective view showing one example of the tourniquet method used for accommodating a honeycomb structure in a metallic container.
Figure 6:
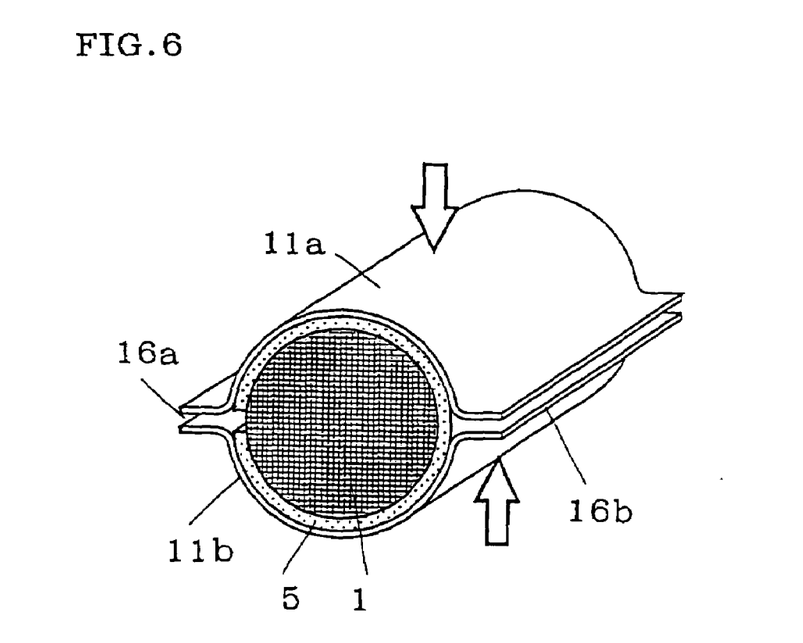
FIG. 6 is a perspective view showing one example of the clamshell method used for accommodating a honeycomb structure in a metallic container.
Figure 7:
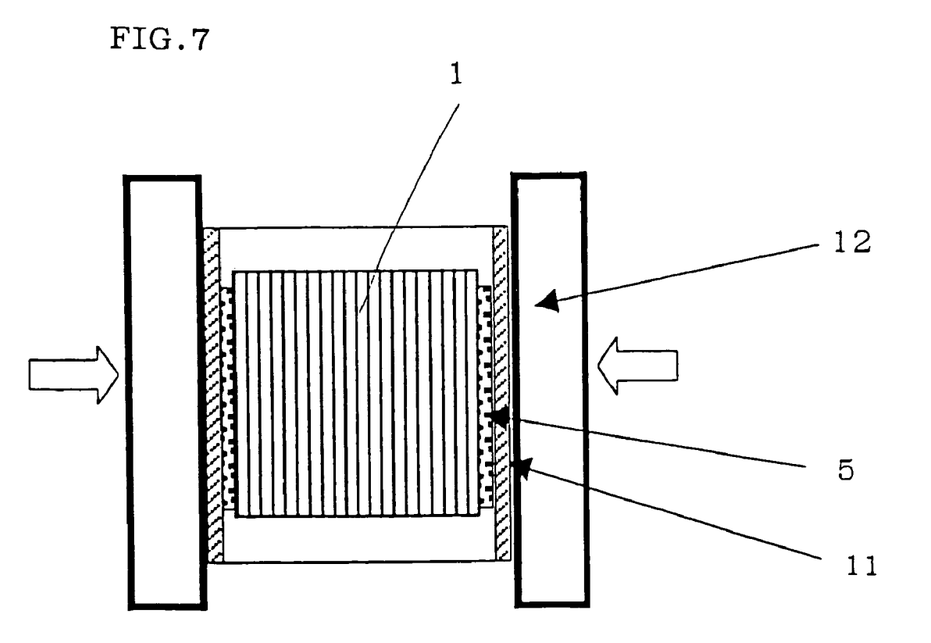
FIG. 7 is a sectional view parallel to the direction of passages, showing one example of the swaging method used for accommodating a honeycomb structure in a metallic container.

In the present invention, as the method for accommodating a honeycomb structure 1 and a material B having compressive elasticity in a metallic container 11 in a compressed state, there are suitably used a stuffing method shown in FIG. 4, using a guide 17; a tourniquet method shown in FIG. 5, which comprises winding a metallic plate 11c around a honeycomb structure, pulling the plate to impart a pressure to the outer surface of the honeycomb structure, and welding and fixing the to-be-jointed areas of the metallic plate 11c; and a clamshell method shown in FIG. 6, which comprises interposing a honeycomb structure between two metallic container parts 11a and 11b with applying a load to the parts 11a and 11b, and welding the to-be-bonded areas (flanges) 16a and 16b of the parts 11a and 11b to obtain a integrated container. There is also suitably used a method (a swaging method) utilizing metal forming technology, shown in FIG. 7, which comprises applying a compression force to a metallic container 11 from the outside via a tap (of pressure type) to squeeze the outer diameter of the metallic container 11.

Figure 8:
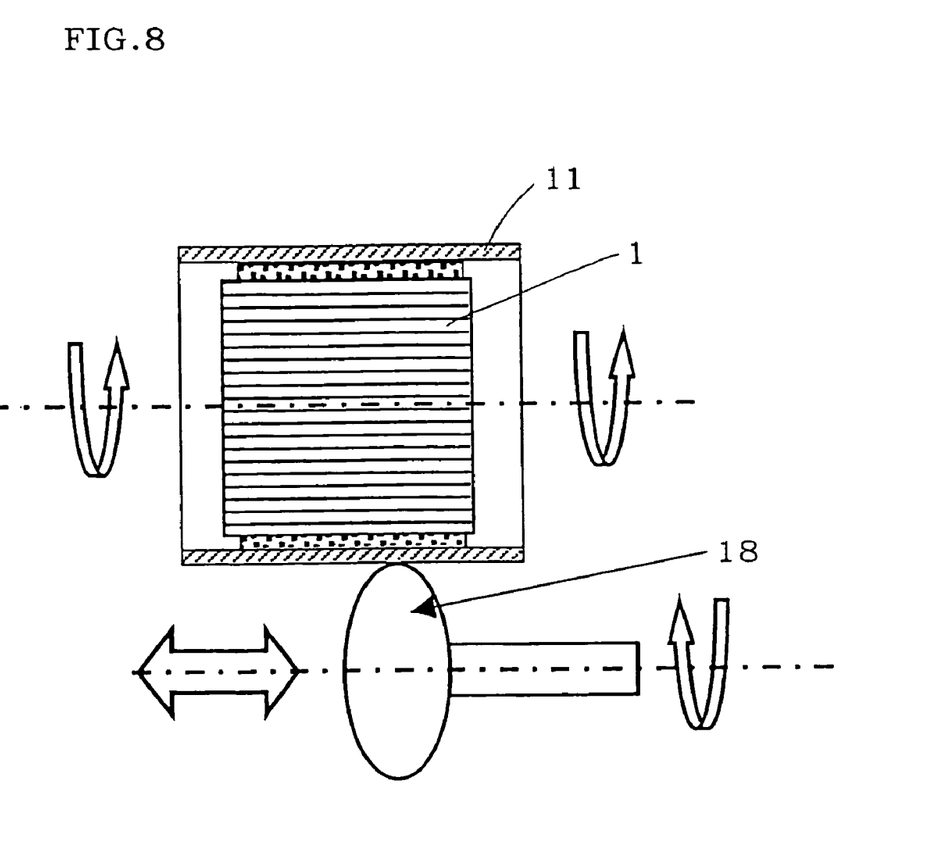
FIG. 8 is a sectional view parallel to the direction of passages, showing one example of the swaging method used for accommodating a honeycomb structure in a metallic container.

There can also be used a method shown in FIG. 8, which comprises squeezing, by metal forming process, the outer surface of a metallic container 11 using a processing jig 18 with the metallic container 11 being rotated, that is, a method which comprises squeezing the outer diameter of a metallic container by rotary forging and thereby imparting a pressure to the outer surface of a honeycomb structure accommodated in the metallic container.

When the honeycomb structure or honeycomb structure assembly of the present invention is used as a substrate for catalyst in an internal combustion engine, a boiler, a chemical reactor, a fuel cell reformer, or the like, the honeycomb segments used therein are allowed to load thereon a metal having a catalytic activity. As representative metals having a catalytic activity, there are mentioned Pt, Pd, Rh, etc. It is preferred that at least one kind selected from these metals is loaded on the honeycomb segments.

Meanwhile, when the honeycomb structure or honeycomb structure assembly of the present invention is used as a filter for trapping and removing the particulate substance contained in an exhaust gas, for example, as a diesel particulate filter (DPF), it is preferred that the cells of honeycomb structure are plugged alternately at each structure end and the cell walls of honeycomb structure are used as a filter.

When an exhaust gas containing a particulate substance is taken into a honeycomb structure constituted by honeycomb segments, from its one end, the exhaust gas enters the inside of the honeycomb structure from those cells not plugged at the one end, passes through porous cell walls having a filtration ability, and is discharged from those cells not plugged at the other end. The particulate substance is trapped by the cell walls at the time of its passing through the cell walls.

The material for plugging the end of the cell can be selected from the materials preferable for the honeycomb segment 2.

As the amount of particulate substance trapped and deposited on cell walls increases, a sudden increase in pressure loss takes place, a load to the engine increases, a reduction in fuel consumption and drivability occurs; hence, the deposited particulate substance is burnt and removed periodically by a heating means such as heater or the like, to regenerate the ability of the filter.

To promote the burning at the time of the regeneration, the honeycomb structure may also be allowed to carry the above-described metal which has the catalytic capability.

In the present invention, for the method of allowing the honeycomb structure or the honeycomb structure assembly to carry the catalyst, there can be used a method which comprises holding a honeycomb structure 1 in a metallic container 11 prior to catalyst loading, and then loading a catalyst on the honeycomb structure 1. According to this method, it is possible to avoid a possibility that the honeycomb structure 1 is chipped or broken in the catalyst loading process. It is also preferred that when the honeycomb structure or honeycomb structure assembly of the present invention is used as a catalytic converter, a catalyst component is loaded on a honeycomb segment 2, then a honeycomb structure 1 is formed, and the structure is accommodated and held in a metallic container 11.

The present invention will be described hereinafter in further detail based on examples, but the present invention is not limited to these examples.

It is to be noted that the honeycomb structures prepared in the following examples and comparative example are filters for trapping diesel particulate, in which cells are alternately plugged and cell walls are used as filters.

EXAMPLE 1

A silicon carbide powder was used as a raw material. Thereto were added methyl cellulose, hydroxypropoxyl methyl cellulose, a surfactant and water to prepare a puddle having plasticity. This puddle was subjected to extrusion molding, and the resulting extrudate was dried using a microwave and hot air.

Subsequently, ends of cells were alternately plugged with a sealant made of the same material as for the honeycomb structure to be obtained, in such a way that each end face of extrudate looked a checkerboard pattern. Then, the resulting material was heated for debindering in a $N_2$ atmosphere and then fired in an Ar atmosphere to obtain the outer segment 2b having a ¼ sectional shape with an outer diameter of 144 mm, inner diameter of 73 mm and length of 152 mm, and the inner segment 2a having a ½ sectional shape with an outer diameter of 72 mm and length of 152 mm. The cell wall thickness and the cell density of the inner segment 2a were 0.38 mm and 31 cells/cm$^2$ respectively. The wall thickness and the cell density of the outer segment 2b were 0.25 mm and 31 cells/cm$^2$ respectively. These honeycomb segments were bonded by a bonding material obtained by mixing colloidal silica and alumina fiber with water and were dried, whereby the cylindrical honeycomb structure 1 having a diameter of 144 mm and length of 152 mm was obtained. Then, a non-intumescent mat of ceramic fiber was wound around the outer periphery of the honeycomb structure 1, the structure was stuffed into the metallic container 11 of SUS409 with a taper jig, and the space between segments and the space between honeycomb structure 1 and metallic container were mutually compressed and fixed, to obtain the honeycomb structure assembly 8 (FIG. 3).

EXAMPLE 2

The honeycomb structure 1 in which the inner segment 2a had a cell wall thickness of 0.38 mm and a cell density of 31 cells/cm$^2$ and the outer segment 2b had a cell wall thickness of 0.25 mm and a cell density of 47 cells/cm$^2$ was obtained by the same manner as in Example 1. Then, a non-intumescent mat of ceramic fiber was wound around the outer periphery of the honeycomb structure 1, the structure was stuffed into the metallic container 11 of SUS409 with a taper jig, and the space between segments and the space between honeycomb structure 1 and metallic container were mutually compressed and fixed, to obtain the honeycomb structure assembly 8.

EXAMPLE 3

The honeycomb structure 1 in which the inner segment 2a had a cell wall thickness of 0.43 mm and a cell density of 31 cells/cm$^2$ and the outer segment 2b had a cell wall thickness of 0.20 mm and a cell density of 47 cells/cm$^2$ was obtained by the same manner as in Example 1. Then, a non-intumescent mat of ceramic fiber was wound around the outer periphery of the honeycomb structure 1, the structure was stuffed into the metallic container 11 of SUS409 with a taper jig, and the space between segments and the space between honeycomb structure 1 and metallic container were mutually compressed and fixed, to obtain the honeycomb structure assembly 8.

EXAMPLE 4

The honeycomb structure 1 in which the inner segment 2a had a cell wall thickness of 0.53 mm and a cell density of 16 cells/cm$^2$ and the outer segment 2b had a cell wall thickness of 0.20 mm and a cell density of 62 cells/cm$^2$ was obtained by the same manner as in Example 1. Then, a non-intumescent mat of ceramic fiber was wound around the outer periphery of the honeycomb structure 1, the structure was stuffed into the metallic container 11 of SUS409 with a taper jig, and the space between segments and the space between honeycomb structure 1 and metallic container were mutually compressed and fixed, to obtain the honeycomb structure assembly 8.

COMPARATIVE EXAMPLE 1

The honeycomb structure 1 in which all the inner and outer segments had a cell wall thickness of 0.38 mm and a cell density of 31 cells/cm$^2$ was obtained by the same manner as in Example 1. Furthermore, the non-expansive mat of ceramic fiber was wound around the outer periphery of the honeycomb structure 1, the structure was pressed into the metal container 11 of SUS409 with the taper jig, and the segments and the honeycomb structure 1 and metal container 11 were mutually compressed/fixed to obtain the honeycomb structure assembly 8.

(Soot Volume Pressure Loss Test)

Figure 9:
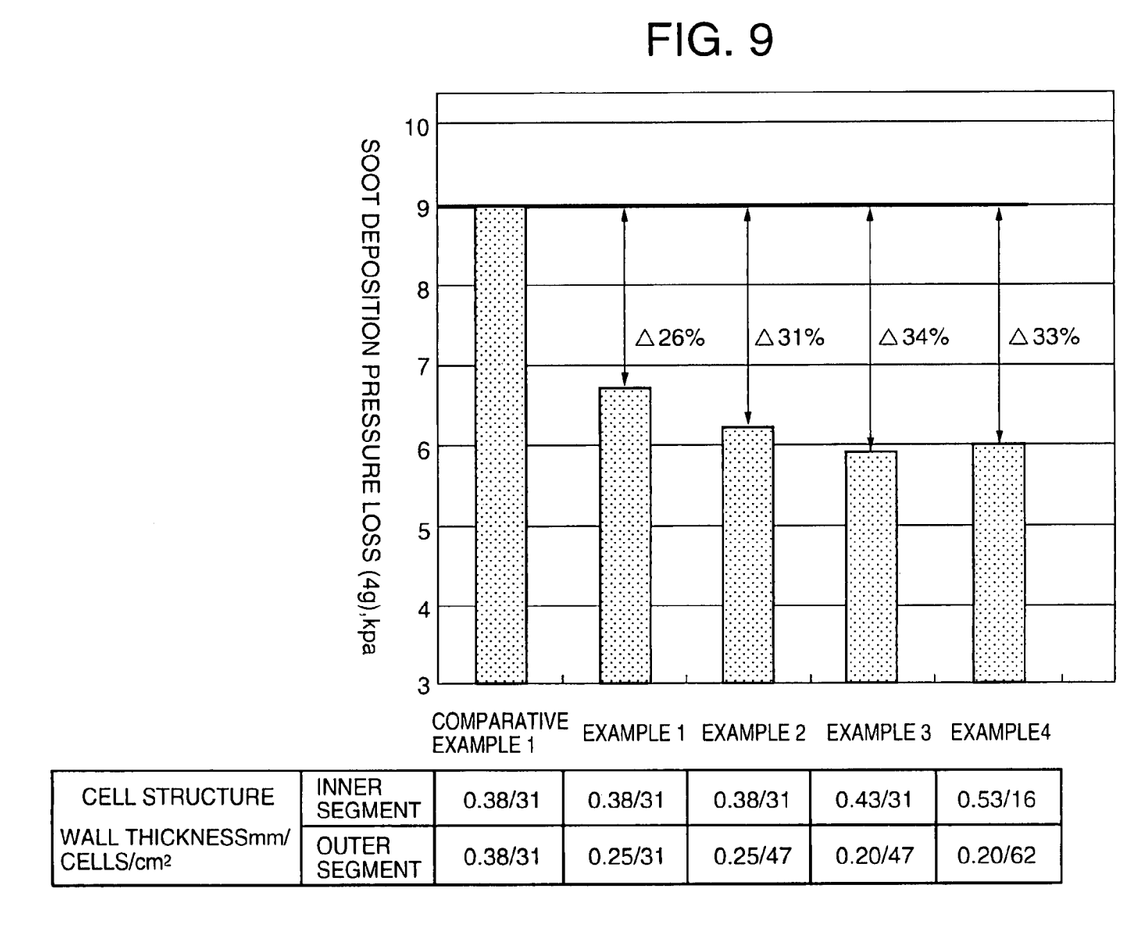
FIG. 9 is a graph showing a result of a test of pressure loss by soot deposition.

Through the honeycomb structural filters (honeycomb structure assemblies) of Examples 1 to 4 and Comparative Example 1 obtained in this manner, the exhaust gas containing particulate (hereinafter referred to as the soot) exhausted from a diesel engine was passed at a temperature of 200° C. and a flow rate of 2.4 Nm$^3$/min. When 4 g of soot was deposited in the honeycomb structural filter, the pressure loss was measured. Test results are shown in FIG. 9. The pressure loss at the time when 4 g of soot was deposited in the filter of Comparative Example 1 was 9.0 KPa. On the other hand, the loss of the filter of Example 1, in which the cell wall thickness of the outer segment was reduced, was 6.7 KPa and was lower than that of the Comparative Example by 26%. Example 2, in which the cell wall thickness was the same as that of Example 1 and the cell density of the outer segment was higher than that of Example 1, showed a pressure loss of 6.2 KPa, and the pressure loss was lower than that of the Comparative Example by 31%. Furthermore, in the filters of Examples 3 and 4, the cell wall thickness of the inner segments was thicker to enlarge heat capacity for a purpose of further reduction of the thermal stress in the honeycomb structure, and they were disadvantageous for the pressure loss. However, pressure losses of 5.9 Kpa and 6.0 Kpa, which were sufficiently lower than that of Comparative Example by 34% and 33% respectively could be obtained by cell wall thickness and cell density of the outer segments being thinner and higher respectively.

(Burning/Regeneration Test)

Figure 10:
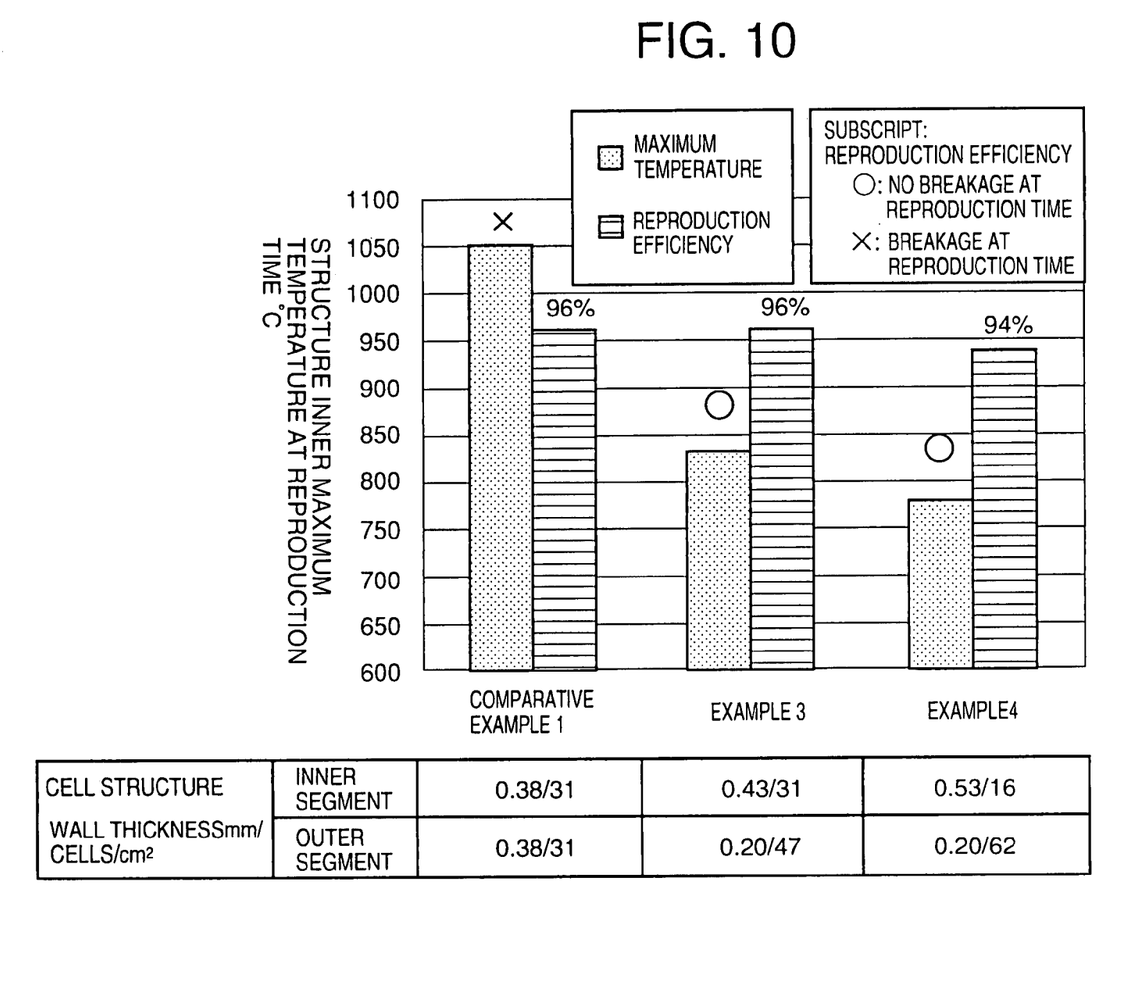
FIG. 10 is a graph showing a result of a test of regeneration by soot combustion.

In each of the honeycomb structural filters of Examples 3, 4 and Comparative Example 1, 30 g of soot was trapped, the soot deposited in the filter was burnt by the exhaust gas having an inlet gas temperature of 700° C., oxygen content of 10%, and flow rate of 0.7 Nm$^3$/min., and the temperatures of 15 portions in the honeycomb structure were measured. After the burning test, the weight of the honeycomb structural filter was measured to obtain the regeneration efficiency of the soot. Furthermore, damages of the honeycomb structure by the burning/regeneration were observed visually and by a stereomicroscope to confirm presence/absence of breakage. The results are shown in FIG. 10.

A maximum temperature in the honeycomb structure of the filter of Comparative Example 1 rose at 1050° C., and the honeycomb structure was broken. On the other hand, for the filters of Examples 3 and 4 according to the present invention, the maximum temperatures were suppressed to be low at 830° C. and 780° C., and soot regeneration efficiency also indicated 90% or more.

INDUSTRIAL APPLICABILITY

As described above, for a honeycomb structure and an assembly thereof according to the present invention, a cell wall thickness of an inner segment is set to be larger than that of an outer segment, the wall thickness and cell density of the outer segment are set to be smaller and higher than that of the inner segment. Accordingly, an effective porosity of a cell wall can be increased, and a filter area can be enlarged. Therefore, a pressure loss at the time of deposition of diesel particulate can be low, maximum temperature generated in the honeycomb structure can be suppressed to be low, and soot regeneration efficiency can be held to be high. Therefore, the honeycomb structure and assembly thereof according to the present invention are low in pressure loss, and indicate superior durability and high efficiency.

The invention claimed is:

1. A honeycomb structure comprising a plurality of honeycomb segments bonded into one piece, each segment having a plurality of cells separated from one another by cell walls and extending through an axial direction, wherein at least one of the honeycomb segments which do not constitute an outermost peripheral surface of the honeycomb structure has an average cell wall thickness larger than an average cell wall thickness of each of the honeycomb segments which constitute the outermost peripheral surface, and a cell density that is smaller than or equal to a cell density of said at least one of the honeycomb segments which constitute the outermost peripheral surface.

2. The honeycomb structure according to claim 1, wherein a ratio of the cell density of at least one of the honeycomb segments which do not constitute the outermost peripheral surface to a cell density of at least one of the honeycomb segments which constitute the outermost peripheral surface is in a range of 1:1 to 1:6.

3. The honeycomb structure according to claim 1, wherein a ratio of the average cell wall thickness in the honeycomb segments which constitute the outermost peripheral surface to the average cell wall thickness in the at least one of the honeycomb segments which do not constitute the outermost peripheral surface is in a range of 0.2 to 0.9.

4. The honeycomb structure according to claim 2, wherein a ratio of the average cell wall thickness in the honeycomb segments which constitute the outermost peripheral surface to the average cell wall thickness in the at least one of the honeycomb segments which do not constitute the outermost peripheral surface is in a range of 0.2 to 0.9.

5. The honeycomb structure according to claim 1, wherein a sectional area of at least one of the honeycomb segments which do not constitute the outermost peripheral surface is in a range of 9% to 81% of a sectional area of the honeycomb structure.

6. The honeycomb structure according to claim 4, wherein a sectional area of at least one of the honeycomb segments which do not constitute the outermost peripheral surface is in a range of 9% to 81% of a sectional area of the honeycomb structure.

7. A honeycomb structure according to claim 1, wherein the honeycomb structure is an exhaust gas purification filter of an automobile.

8. The honeycomb structure according to claim 1, wherein the honeycomb structure is a filter that traps diesel particulate.

9. The honeycomb structure according to claim 1, wherein a material A having compressive elasticity is provided at part or the whole of the space between two adjacent honeycomb segments.

10. The honeycomb structure according to claim 9, wherein the material A having compressive elasticity is a ceramic fiber-made mat.

11. The honeycomb structure according to claim 10, wherein the ceramic fiber-made mat is a non-intumescent mat mainly composed of an alumina or mullite composition.

12. The honeycomb structure according to claim 1, wherein the main component of each honeycomb segment comprises (1) at least one kind of ceramic selected from the group consisting of silicon carbide, silicon nitride, cordierite, alumina, mullite, zirconia, zirconium phosphate, aluminum titanate, titania and combinations thereof, and (2) Fe—Cr—Al, nickel, or metallic Si and SiC.

13. A honeycomb structure assembly comprising;
a honeycomb structure including a plurality of honeycomb segments bonded into one piece, each segment having a plurality of cells separated from one another by cell walls and extending through an axial direction, at least one of the honeycomb segments which do not constitute an outermost peripheral surface of the honeycomb structure having an average cell wall thickness larger than an average cell wall thickness of each of the honeycomb segments which constitute the outermost peripheral surface, and having a cell density smaller than or equal to a cell density of the honeycomb segments which constitute the outermost peripheral surface,
a material B disposed in a compressed state on the outermost peripheral surface of the honeycomb structure, and
a metallic container,
wherein the honeycomb structure is compression-held in the metallic container by the material B.

14. The honeycomb structure assembly according to claim 13, wherein the material B having compressive elasticity is a ceramic fiber-made mat.

15. The honeycomb structure assembly according to claim 14, wherein the ceramic fiber-made mat is a heat-intumescent mat containing vermiculite, or a non-intumescent mat.

16. The honeycomb structure assembly according to claim 13, wherein the honeycomb structure assembly is a canned structure obtained by a stuffing method, a tourniquet method, a clamshell method or a swaging method.

17. The honeycomb structure assembly according to claim 13, wherein the honeycomb structure assembly is obtained by loading a catalyst on the honeycomb segments and then accommodating the catalyst-loaded honeycomb segments in the metallic container.

18. The honeycomb structure assembly according to claim 13, wherein the honeycomb structure assembly is obtained by accommodating the honeycomb segments in the metallic container and then loading a catalyst on the honeycomb segments.

* * * * *